Dec. 2, 1958     J. G. RUSSELL     2,862,736
SEALING ASSEMBLY OF PACKING RINGS OF DIFFERENT QUALITIES
Filed Sept. 28, 1956

INVENTOR.
JOHN G. RUSSELL
BY *John N. Wolfram*
ATTORNEY

United States Patent Office
2,862,736
Patented Dec. 2, 1958

2,862,736

SEALING ASSEMBLY OF PACKING RINGS OF DIFFERENT QUALITIES

John G. Russell, Mayfield Heights, Ohio, assignor to Parker Hannifin Corporation, a corporation of Ohio Application September 28, 1956, Serial No. 612,601

11 Claims. (Cl. 286—26)

This invention relates to sealing assemblies and in particular is concerned with means for protecting and confining rubber-like packing rings.

It is well known that resilient packing rings of rubber or rubber-like materials provide good sealing characteristics when the material is relatively soft and flexible but that such rings will be extruded into small clearance spaces under relatively high fluid pressures. To prevent the latter, it has heretofore been proposed to use back-up rings in conjunction with the rubber packings, such back-up rings being of harder materials, such as plastic, than the rubber. In order to assemble such plastic rings in the packing grooves, it has been necessary to either furnish the plastic ring in split form, or to provide a two part construction for the member in which the packing groove is formed, neither of which methods are entirely satisfactory.

The present invention overcomes this difficulty by providing a solid ring back-up member and a packing groove which are so formed and dimensioned that the one can easily be assembled with the other.

Another object of the invention is to provide a sealing assembly with a packing back-up ring in which the packing ring will make sealing contact with the side wall of the packing groove on the side of the groove in which the back-up ring is mounted.

It is another object to provide a packing groove configuration for use with a rubber O-ring, wherein the groove configuration will assist in preventing spiral failure of the O-ring due to the twisting or rolling action on the O-ring as it slides across the part being sealed.

Other objects of the invention will become apparent from the following description and from the drawings in which.

Figure 1:
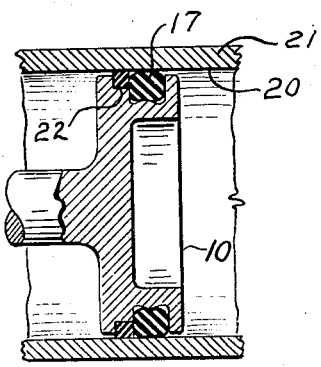
Figure 1 is a cross-section view of the sealing assembly as applied to a piston and cylinder arrangement.
Figure 2:
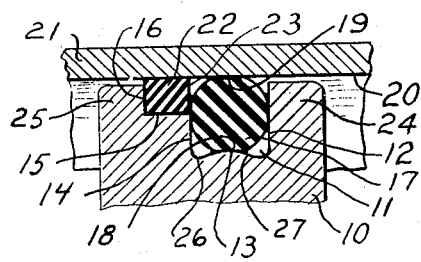
Figure 2 is an enlarged fragmentary section view of the sealing assembly of Figure 1 when there is little or no fluid pressure applied.
Figure 3:
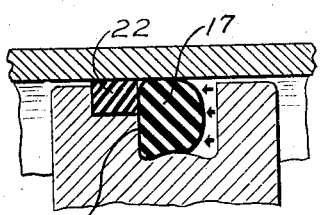
Figure 3 is an enlarged fragmentary view corresponding with Figure 2 but illustrating the parts when fluid pressure is applied.

As shown in the form of the invention illustrated in Figures 1, 2, and 3, a piston head 10 is provided with a packing groove 11 having a side wall 12, a bottom wall 13, and another side wall 14. The latter extends outwardly to a step formed by a bottom wall 15 and a lateral abutment or side wall 16. The flanges 24 and 25 are of a diameter to provide sufficient clearance with the cylinder wall 20 so as to avoid frictional contact therewith.

The bottom wall 13 of the packing groove is preferably recessed deeper at its ends 26 and 27 than in its central portion for a reason to be hereinafter pointed out.

Within the packing groove 11 there is a resilient packing ring 17 of rubber or rubber-like material. This ring is preferably an O-ring, in which the cross-section is round. The O-ring is so dimensioned that preferably it is under slight compression at its inner and outer diameters 18 and 19 where the latter contact the packing groove bottom 13 and inner wall 20 of the cylinder 21, respectively. However, in some instances it may be desirable that the O-ring does not initially contact the bottom wall 13, this contact not being essential to establishing a seal since the O-ring will engage in sealing contact with the side wall 14 to establish a seal between the packing ring and the piston head.

Mounted in the packing groove step is a plastic back-up ring 22. This ring is preferably formed with a close fit upon the bottom wall 15 of the step and with the inner wall 20 of the cylinder so as to present very little or no clearance space into which the rubber packing 17 may be extruded. The plastic ring 22 is preferably the same width as the step so that the inner face 23 of the ring will be substantially in line with the groove side wall 14. The plastic ring 22 is formed of a material such as Teflon which is relatively flexible even though it may be termed a relatively hard material in that its cross-section shape is not readily deformed when subjected to pressures. In addition, Teflon has a low coefficient of friction and will slide easily against the cylinder wall.

The diameter of the step bottom wall 15 is preferably at least the same or of greater diameter than the central diameter of the rubber O-ring. This insures tangent contact between the O-ring and the side wall 14 for establishing a seal therebetween, and also results in a plastic ring 22 of such inside diameter that it can be easily assembled into the packing groove.

Figure 4:
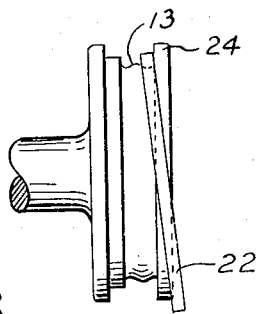
Figure 4 is a view showing the method of assembling the back-up ring to a piston head.

In assembling the parts, the back-up ring 22 is first slipped over the flange 24 of the piston head at one point and then moved to the bottom 13 of the packing groove, as shown in Figure 4. This permits the opposite side of the back-up ring 22 to clear the corresponding side of the piston flange 24. The back-up ring then is moved into position on the step and the rubber O-ring 17 is then stretched over the flange 24 into the packing groove 11.

Figure 6:
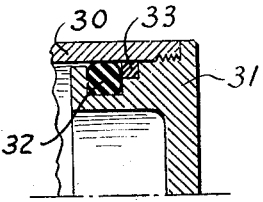
Figure 6 is a form of the invention as applied to a cylinder end cap.
Figure 7:
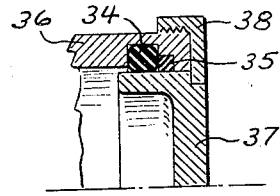
Figure 7 is an optional form for a piston end cap.

When one side of the packing arrangement is always subject to the same or a higher fluid pressure than the other side, only one back-up ring need be provided, as illustrated in Figures 1, 6, and 7. In these instances, the back-up ring is installed between the rubber packing and the low pressure side of the seal assembly. When the fluid pressure on the opposite side of the packing ring 17 becomes higher than the fluid pressure on the side on which the back-up ring is installed, the rubber packing ring 17 is forced against the side wall 14 of the packing groove and the side 23 of the back-up ring, as well as against the inner wall 20 of the cylinder and the bottom wall 13 of the packing groove as shown in Figure 3. The contact with the side wall 14 establishes a seal to supplement the seal between the packing ring and the bottom wall 13 to assist in sealing against leakage which might occur around the inner diameter of the packing ring.

As previously mentioned, the bottom wall 13 of the packing groove is preferably recessed deeper at its ends 26 and 27 than in the central portion. This permits the rubber packing ring 17 to be deformed into one recess or the other, as shown in Figure 3. When the piston moves within the cylinder, the O-ring tends to twist within its groove due to the sliding friction of the packing against the cylinder wall 20. When the direction of movement is reversed, the direction of twist is reversed. This results in internal stresses in the packing which after sufficient repetition will cause cracks to form about the circumference of the O-ring, this condition being termed spiral failure.

When the seal construction of the present invention is reciprocated, the rubber packing is deformed into one or the other of the recesses 26 or 27, depending upon the direction of reciprocation and/or the direction the fluid pressure is acting. This deformation is brought about partly by fluid pressure and partly by the friction forces during reciprocation. The recesses then provide a gripping action upon the rubber tending to minimize the twisting strains as the piston moves within the cylinder.

Figure 6 illustrates the invention as applied to a closure cap for a pressure vessel, as for example on a hydraulic cylinder. In this instance, the pressure vessel 30 is closed by a cap 31 and is sealed by the rubber packing 32 which is protected against outward extrusion through the clearance between the parts 30 and 31 by the plastic back-up ring 33. The packing 32 and back-up ring 33 are mounted in a groove and step formed in the internal cap 31.

Figure 7 illustrates a form of the invention in which the packing 34 and back-up ring 35 are mounted in a groove in an external member, rather than in an internal member. For example, the member 36 may again be a hydraulic cylinder with an internal closure plug 37 and a retainer nut 38.

Figure 5:
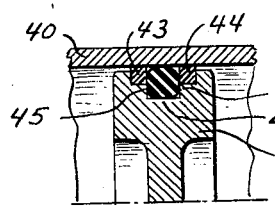
Figure 5 is a cross-section view of a modified form of the invention as applied to a free floating piston, as in an accumulator.

Figure 5 illustrates the invention in an installation where the fluid pressure is alternately higher on one side of the packing than on the other, as for example on the piston of a hydraulic-pneumatic accumulator. In this instance, the accumulator housing 40 will have hydraulic fluid on one side of the free floating piston 41 and air under pressure on the other. The piston 41 will move in either direction, depending upon whether the pressure of the air or hydraulic fluid is momentarily higher than the other. The packing ring 42 may thus move from one side to the other of its confining groove and the back-up rings 43 and 44 will prevent extrusion on the respective side of the packing groove and the packing groove side walls 45 and 46 will be contacted by the packing ring 42 to seal against leakage between the packing ring and the piston 41.

The width of the packing groove in all forms of the invention is preferably such that the packing ring will be in contact with both side walls so as to be in initial sealing contact therewith before fluid pressure is applied.

Figure 8:
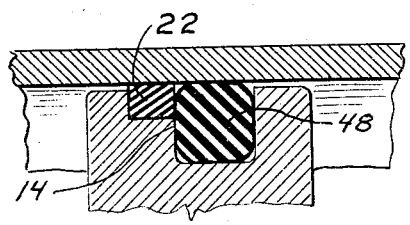
Figure 8 is an enlarged fragmentary cross-section view of an optional form of the sealing assembly.

The invention is not limited to the use of O-ring packings, but other cross-sectional packing shapes may be employed. Figure 8, for example, shows the invention in connection with a rubber packing 48 of sustantially square cross section.

The step adjacent the packing groove permits the use of a solid ring type back-up member which may be readily assembled into position. The side wall contact between the rubber packing and the packing groove wall on the side containing the back-up ring permits or retains a sealing contact which is not possible when a split back-up ring is used which extends to the bottom of the packing groove. However, it will be evident that with the stepped packing groove construction of the present invention, side wall sealing contact will be obtained even though a split type of back-up ring is used. This is still an improvement upon an installation where the split back-up ring extends to the bottom of the packing groove since in the latter instance no side wall sealing action is obtained, but the fullest advantage of the invention is obtained when a solid back-up ring is used because the latter will not present split or irregular surfaces to the rubber packing ring which might cause damage to the same.

It is obvious that various other modifications may be made within the scope of the invention as defined by the claims.

I claim:

1. A packing construction comprising cylindrical inner and outer members, said inner member having a pair of flanges integral therewith and of a diameter to provide a clearance with the outer member, a packing groove in said inner member between said flanges, said groove having a bottom and a pair of side walls, a step in said inner member adjacent said groove and intersecting one of said side walls, a resilient packing ring of rubber-like material in said groove and in sealing contact with the groove bottom and the outer member, a continuous back-up ring on said step and having a close fit with the cylindrical outer member and with said step, said back-up ring being made of a flexible plastic material which is relatively harder than said packing ring, said packing ring having a portion in sealing contact with the side wall intersected by said step, said back-up ring having an inside diameter sufficiently larger than the diameter of the groove bottom whereby one portion of the back-up ring may be initially inserted in the groove when the packing ring has been removed therefrom and the remainder of the back-up ring passed over one of the flanges to facilitate assembly and disassembly of the back-up ring upon the inner member.

2. A packing construction comprising inner and outer members, a packing groove in said inner member, said groove having a bottom and a side wall, a step formed in said inner member adjacent said groove and intersecting said side wall, a flange on at least one side of the packing groove and of larger diameter than the groove bottom, a resilient packing ring in said groove and in sealing contact with both said members, a continuous back-up ring of relatively harder material than the packing ring on said step and serving to prevent extrusion of the resilient packing between said members, said back-up ring having an inside diameter sufficiently larger than the diameter of the groove bottom whereby one portion of the back-up ring may be initially inserted in the groove when the packing ring has been removed therefrom and the remainder of the back-up ring passed over the flange to facilitate assembly and disassembly of the back-up ring upon the inner member.

3. A packing construction in accordance with claim 2 in which the back-up ring is of flexible plastic material and is of less width than the packing groove.

4. In a packing construction, inner and outer members, one of said members having an annular groove, said groove having side walls and a bottom wall, a rubber packing ring within said groove and adapted to make sealing contact with a portion of said groove and with the other of said members for sealing against fluids acting on opposite sides of said packing ring and axially thereof, said groove being substantially the same width as the packing so as to closely confine the packing against sideward movement within the groove, said groove being recessed to a greater depth adjacent its side walls than at a point intermediate its side walls whereby a portion of said packing ring may be deformed into one of said recesses when said packing is forced by fluid pressure to the corresponding side of said groove.

5. A packing construction in accordance with claim 4 in which the groove recesses gradually increase in depth in a direction away from the central portion of the groove bottom.

6. A packing construction in accordance with claim 4 in which the central portion of the groove bottom between the recesses is convexly curved.

7. A packing construction comprising inner and outer members, one of said members having an annular packing groove having a bottom wall and a side wall, a step formed in said last named member adjacent said groove, said step including a bottom wall substantially concentric with said groove bottom wall and intersecting said groove side wall, said step also including a side wall spaced along the axis of the groove from the groove side wall so as to be non-coplanar therewith and extending toward the other of said members, a resilient packing ring mounted in said groove and in sealing contact with both said members, and a continuous backup ring of relatively harder material than the packing ring on said step against said step sidewall and serving to prevent extrusion of said resilient packing between said members in the direction of said backup ring.

8. A packing construction in accordance with claim 7 in which said packing ring has a portion engageable in sealing contact with said groove side wall.

9. A packing construction in accordance with claim 7 in which the packing ring has a substantially round cross section and said groove side wall extends from the bottom wall of the groove to at least a tangent point with the packing ring.

10. A packing construction in accordance with claim 7 in which said groove has a second side wall and said packing ring is in initial contact with both said groove side walls.

11. A packing construction in accordance with claim 7 in which said groove has a second side wall opposite the first groove side wall and there is a second step adjacent said groove, said second step including a bottom wall substantially concentric with said groove bottom wall and intersecting said second groove side wall, said second step also including a side wall axially displaced from the groove second side wall so as to be non-coplanar therewith and extending toward the other of said members, and a second continuous backup ring of relatively harder material than the packing ring on said second step against said second step side wall and serving to prevent extrusion of said resilient packing between said members.

References Cited in the file of this patent

UNITED STATES PATENTS

| | | |
|---|---|---|
| 2,420,104 | Smith | May 6, 1947 |
| 2,494,598 | Waring | Jan. 17, 1950 |
| 2,739,855 | Bruning | Mar. 27, 1956 |
| 2,749,193 | Traub | June 5, 1956 |
| 2,757,994 | Snyder | Aug. 7, 1956 |

FOREIGN PATENTS

| | | |
|---|---|---|
| 616,509 | Great Britain | Jan. 21, 1949 |